(12) United States Patent
Faruque et al.

(10) Patent No.: US 6,208,615 B1
(45) Date of Patent: Mar. 27, 2001

(54) BROADBAND WIRELESS ACCESS BASED ON CODE DIVISION PARALLEL ACCESS

(75) Inventors: Saleh Faruque; Fereidoun Homayoun; Payam Maveddat; Wing Lo, all of Plano, TX (US)

(73) Assignee: Northern Telecom Limited, Montreal (CA)

( * ) Notice: Subject to any disclaimer, the term of this patent is extended or adjusted under 35 U.S.C. 154(b) by 0 days.

(21) Appl. No.: 09/086,886

(22) Filed: May 29, 1998

(51) Int. Cl.[7] ....................................................... H04J 13/00
(52) U.S. Cl. ............................................. 370/209; 370/335
(58) Field of Search ..................................... 370/209, 208, 370/320, 335, 342, 441, 479; 375/205

(56) References Cited

U.S. PATENT DOCUMENTS

| | | |
|---|---|---|
| 5,063,571 | 11/1991 | Vancraeynest . |
| 5,235,614 | 8/1993 | Bruckert et al. . |
| 5,515,396 | 5/1996 | Dalekotzin . |
| 5,764,690 | * 7/1998 | Blanchard et al. ................... 375/206 |
| 5,781,583 | 9/1999 | Bruckert et al. . |
| 5,987,076 | * 11/1999 | Zehavi et al. ......................... 375/340 |
| 6,038,263 | * 3/2000 | Kotzin et al. ......................... 375/299 |

FOREIGN PATENT DOCUMENTS

| | | |
|---|---|---|
| 0 878 930 | 11/1998 | (EP) . |
| 0 944 198 | 9/1999 | (EP) . |

OTHER PUBLICATIONS

Shigenobu Sasaki et al. : "*Performance of Differential Parallel Combinatory Spread Spectrum Communication Systems*"Electronics & Communications in Japan, Part I – (1995–10–01), p. 73–84, XP000546400 ISSN: 5756–6621 summary, part 2.

* cited by examiner

*Primary Examiner*—Douglas W. Olms
*Assistant Examiner*—Ken Vanderpuye
(74) *Attorney, Agent, or Firm*—John D. Crane

(57) ABSTRACT

A number of user IDs are assigned to each wireless device. The number of user IDs required is based on the type of information transmitted (e.g., video, voice, or data). The user ID's generate the orthogonal Walsh codes used to cover a data signal to be transmitted. Each Walsh code is $2^n$-bits in length and the memory size is $2^n \times 2^n$ where n is the number of bits in the Walsh code. Each unique user ID addresses a memory to generate a unique Walsh code corresponding only to that user ID. The orthogonal codes output from the memory cover the information to be transmitted. This results in the transmitted signal being orthogonal to other users and also orthogonal within the transmitting user's own signal bursts.

11 Claims, 4 Drawing Sheets

BROADBAND WIRELESS ACCESS BASED ON CODE DIVISION PARALLEL ACCESS

BACKGROUND OF THE INVENTION

I. Field of the Invention

The present invention relates to radio communications. More particularly, the present invention relates to mobile communication in a code division multiple access system.

II. Description of the Related Art

Multiple access techniques are designed to make efficient use of the limited radio frequency spectrum. They allow users to access the same band of frequency without interfering with each other. Examples of such techniques include time division multiple access (TDMA), frequency division multiple access (FDMA), and code division multiple access (CDMA).

CDMA wireless technology, governed by Electronic Industry Association/Telecommunication Industry Association Interim Specification-95 (IS-95), employs a spread spectrum technique for the transmission of information. A spread spectrum system uses a modulation technique that spreads the transmitted signal over a wide frequency band. This frequency band is typically substantially wider than the minimum bandwidth required to transmit the signal.

A form of frequency diversity is obtained by spreading the transmitted signal over a wide frequency range. Since only part of a signal is typically affected by a frequency selective fade, the remaining spectrum of the transmitted signal is unaffected. A receiver that receives the spread spectrum signal, therefore, is affected less by the fade condition than a receiver using other types of signals.

The spread spectrum technique is accomplished by modulating each base band data signal to be transmitted with a unique wide band spreading code. Using this technique, a signal having a bandwidth of only a few kilohertz can be spread over a bandwidth of more than a megahertz. Typical examples of spread spectrum techniques are found in M. K. Simon, *Spread Spectrum Communications*, Volume I, pp. 262–358.

In a CDMA-type radiotelephone system, multiple signals are transmitted simultaneously on the same frequency. A particular receiver determines which signal is intended for that receiver by the unique, orthogonal spreading code, referred to as a Walsh code, in each signal. The signals at that frequency, without the particular spreading code intended for that particular receiver, appear to be noise to that receiver and are ignored.

A generic CDMA transmitter and receiver are illustrated in FIGS. 1A and 1B respectively. The transmitter in FIG. 1A convolutionally encodes (100) an input data signal. The encoded signal is spread (105) by the Walsh code (106) such that the output of the spreading operation yields the symbol stream of the Walsh code representing "0" and the complement of the Walsh code representing "1". This output is then modulated (110).

The receiver of FIG. 1B demodulates (115) the received signal. The demodulated signal is then despread (120) using the same Walsh code (116). The de-spread signal is de-interleaved and input to the Viterbi decoder (125).

For each user of the CDMA system of FIG. 1, symbol-0 is represented by a Walsh code and symbol-i is represented by its complementary Walsh code. Since $W_i$ and $\overline{W}_i$ are non-orthogonal to each other, the bit error rate performance of this scheme is solely determined by the forward error control coding. The forward error control coding scheme is well known in the art.

The demand for reduced error transmission has been on the rise in recent years. New wireless services have emerged recently, such as broad band multimedia communications, that require lower bit error rates. Multimedia applications may require bit error rates (BER) as low as $10^{-10}$.

IS-95 CDMA, however, cannot reduce interference or improve capacity any further. As observed in FIG. 1, the symbol stream to be transmitted is the Walsh code and its complement which are always non-orthogonal. Therefore, a conventional IS-95 CDMA receiver correlates with a pair of non-orthogonal signals. This translates into a poor BER at the output of the decoder in a multipath environment.

The typical BER that is offered by the forward error control coding mechanism is inadequate for satellite and broadband multimedia applications. There exists an unforeseen need for a more robust multiple access radio communications technique for broadband terrestrial and satellite communications. The technique should decrease the BER while not having a detrimental affect on capacity.

SUMMARY OF THE INVENTION

The present invention encompasses a multi-orthogonal code division parallel access apparatus for operation in a wireless communication system. The system is comprised of a network of base stations that communicate with wireless devices.

The wireless device requests a number of user identification (ID) codes from the base station with which it is communicating. The smaller the bit error rate required, the more user ID's that are needed. For example, transmitting video requires a larger number of user ID's than transmitting voice.

The apparatus is comprised of a memory that stores a plurality of $2^n$-bit Walsh codes. The memory is addressed by the user ID's such that each unique user ID generates a corresponding unique Walsh code from the memory.

A Walsh code register is coupled to the memory and the input data stream. The register covers a predetermined number of bits of the input data stream with a predetermined Walsh code to generate a serial symbol stream that is orthogonal to other symbol streams in the communication system.

A modulator, coupled to the Walsh code register, modulates the symbol stream for transmission over a wireless channel. In the preferred embodiment, minimum shift keying (MSK) modulation is used.

In the preferred embodiment, the base station of the present invention is a satellite that communicates with terrestrial radiotelephones able to receive satellite signals. In alternate embodiments, terrestrial base stations are used.

The present invention may be used in both the base stations and the wireless devices. Alternate embodiments use the present invention in only the base stations or only the wireless devices.

DETAILED DESCRIPTION OF THE PREFERRED EMBODIMENT

The m-orthogonal process and apparatus of the present invention is a parallel access technique that assigns two or more orthogonal codes to each user. This permits orthogonality in two dimensions, between each user in a communication system and within any user's own signal bursts. The present invention, therefore, lowers the symbol error rate while increasing system capacity.

The number of orthogonal codes assigned to each user is variable, depending on the type of information to be transmitted, and proportional to the information rate. Video, data, and voice each have different bandwidth and error requirements that require varying data rates and, thus, varying quantities of orthogonal codes.

Figure 1A:
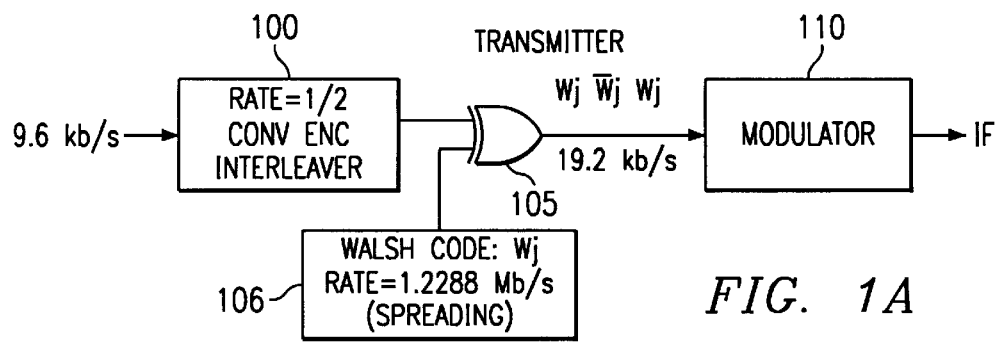
FIGS. 1A and 1B show a block diagram of a typical prior art transmitter and receiver in a CDMA system.
Figure 1B:
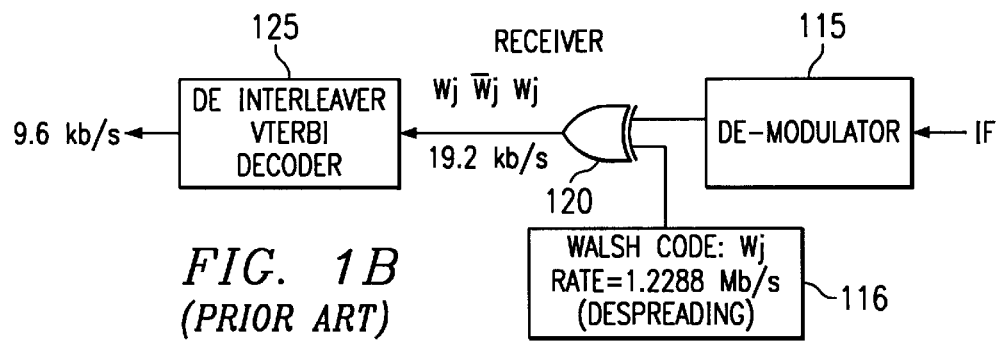
Figure 2:
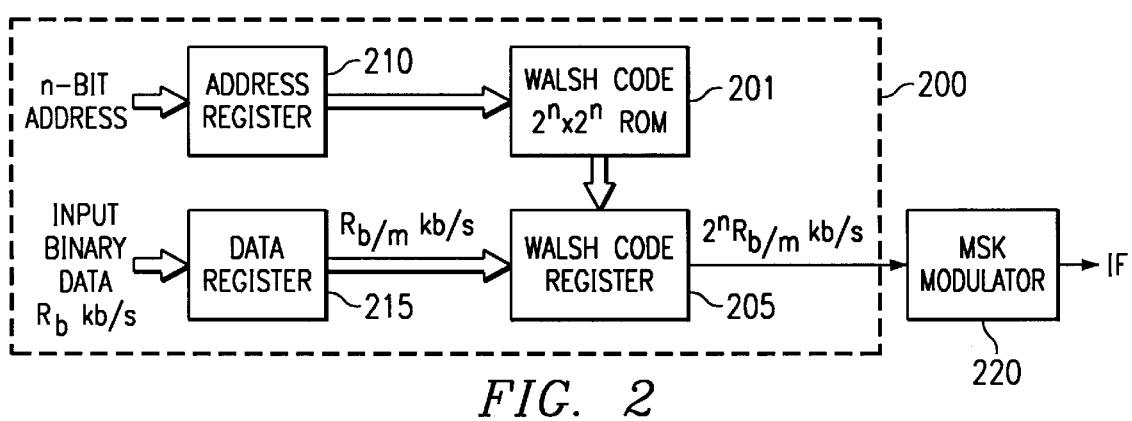
FIG. 2 shows a block diagram of the m-orthogonal Walsh code division parallel access apparatus of the present invention.

FIG. 2 illustrates a block diagram of the m-orthogonal Walsh code division parallel access apparatus of the present invention. In the preferred embodiment, the required number of n-bit user identifications (IDs) or addresses is transmitted from the base station to the radiotelephone over a paging channel. In the preferred embodiment, the user IDs are six bit addresses.

The user IDs uniquely identify the radiotelephone to the system in a similar fashion as CDMA user IDs. As is well known in the CDMA art, each radiotelephone recognizes only those received signals that have been covered by orthogonal Walsh codes generated by those particular user IDs.

The base station, knowing in advance the type of information that will be transmitted to the radiotelephone, transmits to the radiotelephone the required number of user IDs to generate the Walsh codes. This enables the radiotelephone to despread a received signal.

Similarly, the radiotelephone, knowing in advance the type of information that it is going to transmit, requests the required number of user ID's from the base station. The radiotelephone then uses these user IDs to generate the Walsh codes required. These Walsh codes are then used to spread the symbols to be transmitted to the base station.

The number of orthogonal codes required by the radiotelephone is based on the type of information that the radiotelephone is going to transmit or receive. An example of different types of information and the required number of codes is illustrated in FIG. 8.

Figure 8:
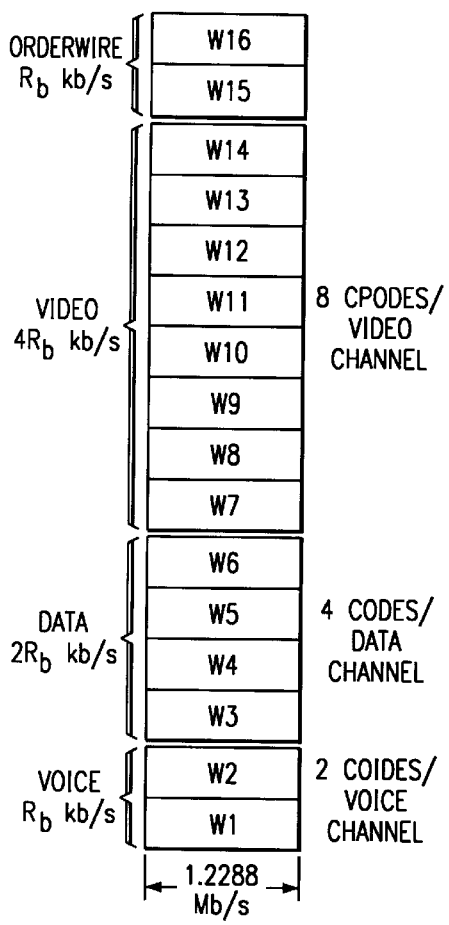
FIG. 8 shows a Walsh code representation of a multitasking use of the m-orthogonal Walsh code generation of the present invention.

FIG. 8 illustrates the number of codes required, in the preferred embodiment, for each type of information in a multitasking scheme. Multitasking is a process in which multiple services, such as voice, data, video, and others, are provided over the same channel. For a given bandwidth BW, the number of Walsh codes, $N_W$, required for a particular type of information is expressed as:

$$N_W = 2^{nR_b/BW}.$$

Since voice service has the lowest bit rate of $R_b$ kbps, the radiotelephone is assigned two Walsh codes, W1 and W2, per voice channel. Data has the next highest data rate of $2R_b$ kbps and is assigned four Walsh codes, W3–W6, per data channel. Video requires the highest data rate of $4R_b$ kbps and is assigned eight Walsh codes, W7–W14, per video channel. An orderwire option requires only two Walsh codes, W15 and W16, per channel.

In the preferred embodiment, orderwire is a special service that might be activated during a radiotelephone call. This special service can include, for example, a customer survey.

The above-described Walsh code requirements for each type of information is one example. Alternate embodiments assign other quantities of Walsh codes to the various types of information. For example, for lower quality voice data, only one Walsh code may be assigned to the radiotelephone.

In the preferred embodiment, each orthogonal code represents a sequence of A-bit address words where m=2A, A=1, 2, . . . These A-bit address words are generated by splitting the input binary data into A-parallel streams. The A-bit address words generate a spreading bandwidth of:

$$BW = {}^{nR_b}/_A \text{kbps},$$

where n is the number of bits in the Walsh code, $R_b$ is the information rate, and A is the number of parallel streams of input binary data. In the preferred embodiment, the Walsh codes are 64 bits (n=6) and the information rate is 9.6 kbps. Alternate embodiments use other values.

As an example of the operation of the present invention, referring again to FIG. 2, the received user IDs are used as the n-bit addresses to the $2^n \times 2^n$ bit read only memory (ROM) (201). In the preferred embodiment, the user IDs are latched into the address register (210) in the order that they are received.

The ROM (201) contains the Walsh codes used in the radiotelephone system. Other embodiments use other forms and sizes of memory to store the Walsh codes. These can include non-volatile RAM, PROM, and EPROM. The size of the memory required is based on the length of the address or user ID used.

The binary data to be transmitted, clocked at a rate of $R_b$ kbps, is input to a data register (215). In the preferred embodiment, the input signal is a low speed NRZ data signal having a narrow power spectrum. The data is output at a rate of $R_b/_m$ kbps, where m is the length of the data register (215). This data rate is required due spreading of each symbol by a Walsh code from the ROM.

The spreading occurs in the Walsh code register (205). This register accepts the Walsh codes output from the Walsh code ROM (201) and the binary data to be encoded. This operation generates the spread data for transmission and is output from the Walsh code register (205) at a rate of $2^n R_b/_m$ kbps.

Figure 4:
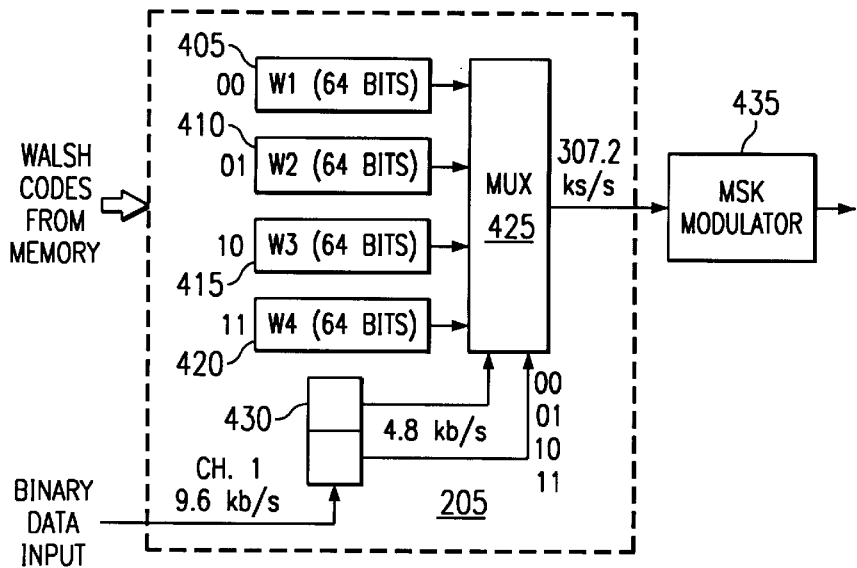
FIG. 4 shows a quadri-orthogonal code division parallel access apparatus of the present invention.
Figure 6:
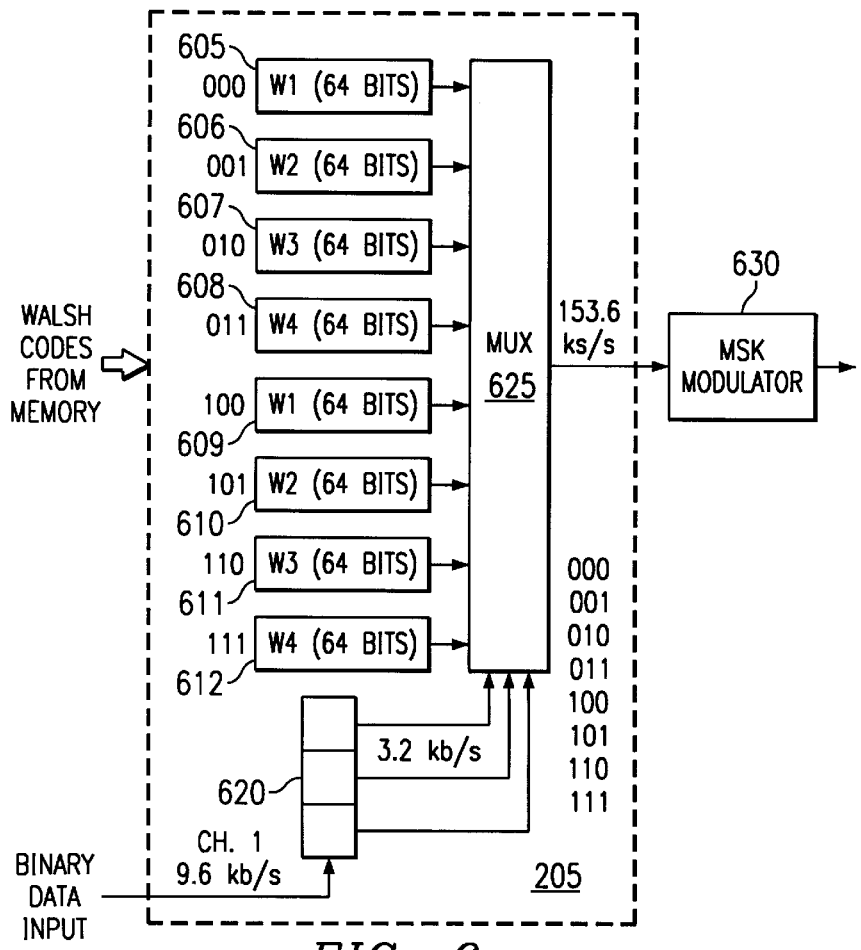
FIG. 6 shows an octo-orthogonal code division parallel access apparatus of the present invention.

FIGS. 4 and 6, discussed later, illustrate different embodiments for the Walsh code register (205). Another embodiment is an exclusive-OR operation involving the Walsh code and the input binary data.

The spread symbols are input to the minimum shift keying (MSK) modulator (220) for modulation to the intermediate frequency before transmission over the channel. The MSK modulation process is well known in the art and is not discussed further.

The digital portion (200) of the m-orthogonal Walsh code generating apparatus, in the preferred embodiment, is implemented in a computer. An example of such a computer is the APPLE MACINTOSH POWERBOOK 1400. Other makes and models of computers running different operating systems can also be used.

In an alternate embodiment, the apparatus can be implemented using discrete logic such as separate registers and memory to perform the illustrated functions. In yet another embodiment, the apparatus is implemented in a digital signal processor.

Implementing the functions of the m-orthogonal Walsh code generating apparatus in a computer reduces the parts required to form a digital radio. By coupling an MSK modulator and antenna to a port on the computer, the computer is used to perform all of the processing. This enables the computer to connect to the Internet or other services in a wireless fashion without an expensive additional radiotelephone.

In an alternate embodiment, the modulator can be built into a specialized computer. With this set-up, the user does not have to purchase and install any additional parts.

Orthogonal decoding is a process of code recovery from the output of the demodulator. The recovery is accomplished by code correlation.

Figure 3:
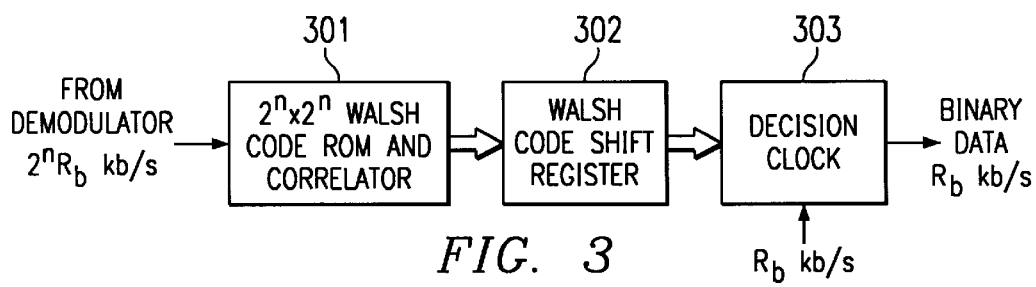
FIG. 3 shows a block diagram of the m-orthogonal demodulation and decoding apparatus of the present invention.

The orthogonal decoding process is illustrated in FIG. 3. The incoming impaired Walsh code, at a rate of $2^n R_b$ kbps, is examined for correlation with one of the $2^n$ bit Walsh codes stored in the Walsh code ROM (301). The recovered code is loaded into the Walsh code shift register (302). The decision block (303), clocked at the information rate of $R_b$ kbps, decides whether the binary value should be either a logic one or zero. This decision is based on each Walsh code.

Figure 9:
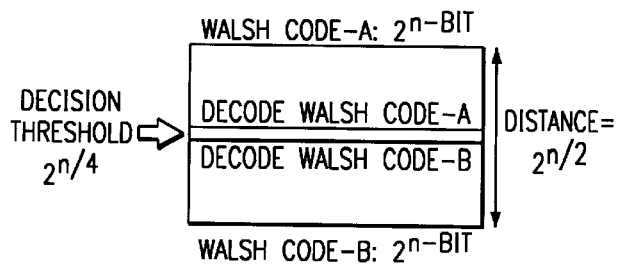
FIG. 9 shows a Walsh code decoding rule in accordance with the present invention.

The decision threshold used to generate the binary data is illustrated in FIG. 9. The decision threshold is set midway between the two orthogonal codes. Since an orthogonal code has equal numbers of logical 1's and logical 0's, a $2^n$-bit orthogonal code will have $2^n/2$ logical 1's and $2^n/2$ logical 0's. The distance between two orthogonal codes is also $2^n/2$ and, therefore, the decision threshold is $2^n/4$.

If the number of symbol errors is more than $2^n/4$, a false detection will take place and the number of symbol error will be greater than or equal to $2^n/4$. The symbol error rate for a false detection is therefore $2^n/4 - 1$.

The decision criterion for a valid Walsh code is that the $2^n$-bit comparison must yield less than or equal to $2^n/4$ errors that may occur in any order. Consequently, the Walsh code Error Probability P(W), follows the formulation of Bernoulli trials:

$$P(W) = \sum_{i=(2^n/4)+1}^{2^n} \binom{2^n}{i} (1-P_e)^{2^n-i} P_e^i$$

where $P_e$ is the symbol error rate.

With QPSK modulation and non-coherent detection, $P_e$ can be estimated, in white Gaussian noise, as:

$$P_e = \frac{1}{\sqrt{\pi}} \exp\left(-\frac{E_b}{N_o}\right).$$

Figure 10:
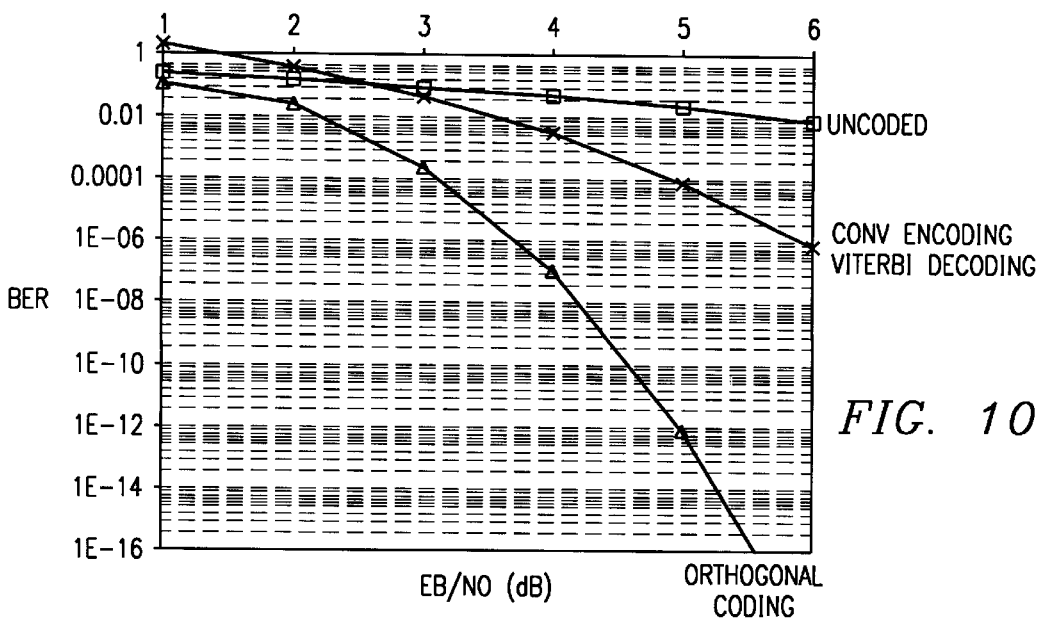
FIG. 10 shows a plot of symbol error rate versus $E_b/N_o$.

P(W) and $P_e$ are plotted in FIG. 10 as a function of $E_b/N_o$. This plot shows that the symbol error rate approaches 0.25 while the Walsh code error rate also approaches 0.25. At this point, the probability of accepting a true Walsh code is equal to the probability of rejecting a false Walsh code which is equal to ½. This implies that as long as P(W)≦0.25, the correlator will always detect the valid Walsh code that corresponds to the error free n-bit information.

One embodiment of the Walsh code register (205) of FIG. 2, is illustrated in FIG. 4. This embodiment illustrates a quadri-orthogonal code division parallel access apparatus.

In operation, the radiotelephone has requested four user IDs from the base station. The first user ID is applied to the Walsh code ROM (see FIG. 2) as an address. The 64-bit Walsh code generated from that user ID is loaded into a first shift register (405). This process is repeated for the remaining three user IDs that generate Walsh codes that are loaded into the remaining shift registers (410, 415, and 420).

The binary data to be spread is input to a two-bit register (430) or similar device at a rate of 9.6 kbps. The register (430) is coupled to the selection inputs of a multiplexer (425). The data is output from the register (430) to the selection inputs at a rate of 4.8 kbps.

The shift registers (405, 410, 415, and 420) with the Walsh codes are coupled to the multiplexer's data inputs. As is well known in the art, the selection inputs select which data input is coupled to the multiplexer's output.

A series of two data bits is used to select a corresponding Walsh code. For example, a data bit sequence of 00 selects W1, a data bit sequence of 01 selects W2, a data bit sequence of 10 selects W3, and a data bit sequence of 11 selects W4. Alternate embodiments use other logical bit sequences to select Walsh codes W1–W4.

The input data stream continuously selects the appropriate Walsh code based on each two-bit sequence. This embodiment does not require the exclusive-OR operation to spread each data bit. In this case, every two data bits select an appropriate Walsh code to replace the bits.

The multiplexer (425) outputs the selected Walsh codes to the MSK modulator (435) at a rate of 307.2 ksps. The modulator modulates the Walsh code sequences for transmission over the channel.

Figure 5:
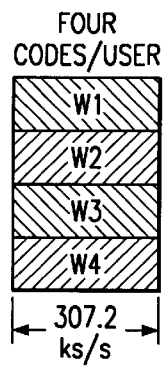
FIG. 5 shows a representation of the Walsh codes and bandwidth in accordance with FIG. 4.

FIG. 5 illustrates a representation of the Walsh code output generated by the apparatus of FIG. 4. There are now four Walsh codes per user at a bandwidth of 307.2 ksps.

FIG. 6 illustrates another embodiment of the Walsh code register (205) of FIG. 2. This figure illustrates an octo-orthogonal code division parallel access apparatus.

In operation, the radiotelephone has requested eight user IDs from the base station. The first user ID is applied to the Walsh code ROM (see FIG. 2) as an address. The 64 bit Walsh code generated from that user ID is loaded into a first shift register (605). This process is repeated for the remaining seven user IDs that generate Walsh codes that are loaded into the remaining shift registers (606–612).

The binary data to be spread is input to a three-bit register (620) or similar device at a rate of 9.6 kbps. The register (620) is coupled to the selection inputs of a multiplexer (625). The data is output to the selection inputs at a rate of 3.2 kbps.

The shift registers (605–612) with the Walsh codes are coupled to the multiplexer's data inputs. As is well known in the art, the selection inputs select which data input is coupled to the multiplexer's output.

A series of three data bits is used to select a corresponding Walsh code. For example, a data bit sequence of 000 selects W1, a data bit sequence of 001 selects W2, a data bit sequence of 010 selects W3, a data bit sequence of 011 selects W4, a data bit sequence of 100 selects W5, a data bit sequence of 101 selects W6, a data bit sequence of 110 selects W7, and a data bit sequence of 111 selects W8. Alternate embodiments use other logical bit sequences to select Walsh codes W1–W8.

The input data stream continuously selects the appropriate Walsh code based on each three-bit sequence. This embodiment does not require the exclusive-OR operation to spread each data bit. In this case, every three data bits select an appropriate Walsh code to replace the bits.

The multiplexer (625) outputs the Walsh code sequence to the MSK modulator (630) at a rate of 153.6 ksps. The modulator (630) modulates the Walsh code sequence for transmission over the channel.

Figure 7:
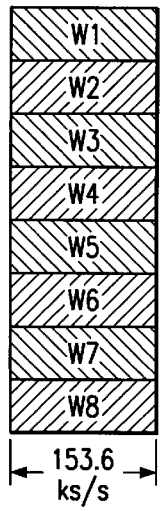
FIG. 7 shows a representation of the Walsh codes and bandwidth in accordance with FIG. 6.

FIG. 7 illustrates a representation of the Walsh code output generated by the apparatus of FIG. 6. There are now eight Walsh codes per user at a bandwidth of 153.6 ksps.

In another embodiment, the registers (620 and 430) of FIGS. 4 and 6 respectively are variable length registers. This enables each apparatus to accept variable length bit sequences for spreading depending on the type of information to be transmitted.

As in all embodiments of the present invention, the embodiments of FIGS. 4 and 6 are illustrated using discrete components. In the alternative, the digital portions of these embodiments could be implemented in a personal computer. In those cases, the spread signal from the computer would be output to the MSK modulator for modulation and then transmission.

The preferred embodiment modulation, as discussed above, is MSK. Alternate embodiments use other forms of modulation such as quadriphase shift keying (QPSK). QPSK modulation is used in an IS-95 CDMA environment and is well known in the art.

Figure 11:
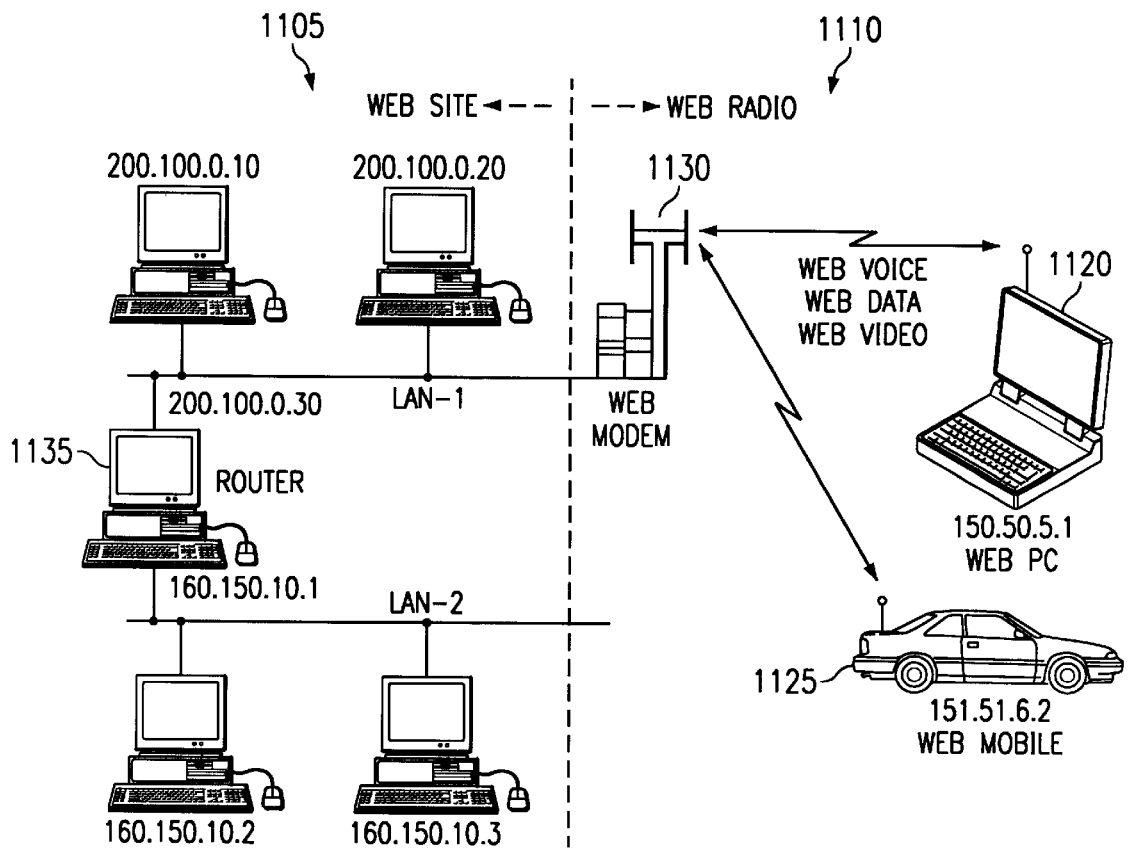
FIG. 11 shows a Web Radio system implementation of the present invention.

FIG. 11 illustrates an example of an implementation of the code division parallel process of the present invention. This implementation, subsequently referred to as Web Radio, is made possible by the extremely low bit error rates experienced by the present invention.

The Web Radio system is comprised of the Web Site (1105) and a Web Radio portion (1110). The Web Site (1105) is comprised of a typical local area network where each device is assigned an Internet Protocol (IP) address. When a first device sends a message to another device, it simply combines the destination IP address, the source IP address, and payload and puts the message on the network. This type of network is well known in the art.

The Web Radio portion (1110) of the system is comprised of a Web Modem (1130) and a number of wireless devices such as Web personal computers (PC) (1120) and Web Mobiles (1125). The Web PCs (1120) and Web Mobiles (1125) are each comprised of an embodiment of the code division parallel access apparatus illustrated above.

The destination address of a network device coupled to the network through the Web Modem (1130) is unique to mobile devices. For example, in this embodiment, a block of addresses starting with 150 may be set-aside for mobile devices. This is known to the network router (1135). When it is determined that the destination address is a Web PC (1120) or Web Mobile (1125), the frame is routed to the Web Modem (1130).

The Web Modem (1130) comprises one of the code division parallel access embodiments illustrated above. The Web Modem (1130) converts the data into an orthogonal frame for transmission over a channel to a Web PC (1120) or Web Mobile (1125).

The process works in reverse for frames transmitted by either the Web PCs (1120) or the Web Mobiles (1125) to the Web Modem (1130). The transmitted orthogonal frames are decoded by the Web Modem (1130) into binary data frames for use by the other devices on the network.

No error control coding is required in the frame structure of the Web Radio system messages. This is a result of the payload being a Walsh code that covers the information as described above in the various embodiments of the present invention. The wireless destination device, like all the devices on the wireline network, ignores all the messages not containing the appropriate destination address.

Figure 12:
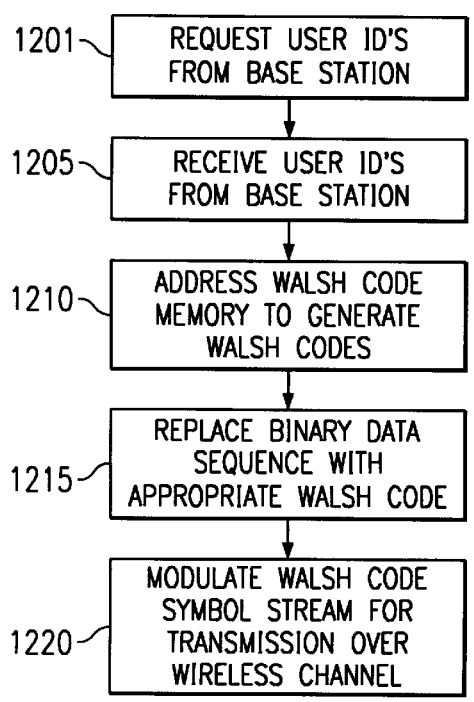
FIG. 12 shows a flowchart of a code division parallel access process used by a wireless device of the present invention.

FIG. 12 illustrates the process a wireless device uses to communicate in a code division parallel access communication system. Since the wireless device knows what type of information it is going to send (e.g., video, voice, data), it requests (step 1201) the appropriate number of user ID's from the base station with which it is communicating.

The base station returns the requested number of user ID's to the wireless device (step 1205). The wireless device then uses these user ID's as addresses to address (step 1210) the Walsh code ROM, thus generating a unique, orthogonal Walsh code for each unique user ID.

The binary data to be encoded is input to the apparatus of the present invention where it is spread (step 1215) with the Walsh coding. In the preferred embodiment, a sequence of input data bits selects a certain Walsh code to replace those data bits as a serial Walsh code symbol stream. As seen in the embodiments of FIGS. 4 and 6 above, the length of the sequence of data bits is determined by the number of Walsh codes used.

The Walsh code symbol stream is then modulated (step 1220) for transmission over the wireless channel. This channel, in the preferred embodiment, is between a terrestrial wireless device and a satellite base station. Alternate embodiments locate the base station terrestrially.

Figure 13:
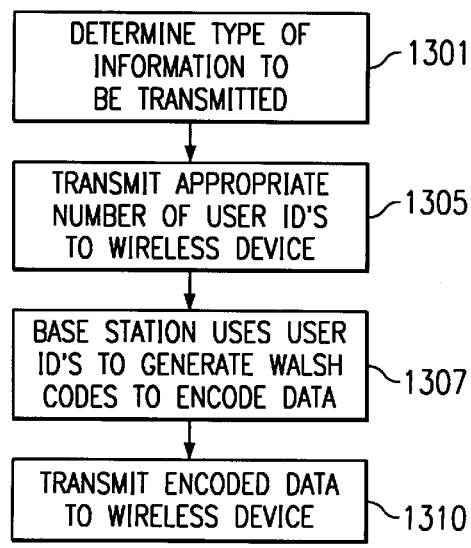
FIG. 13 shows a flowchart of a code division parallel access process used by a base station of the present invention.

FIG. 13 illustrates the process a base station uses to transmit to a wireless device in a code division parallel access communication system. The base station first determines the type of information to be transmitted to the wireless device (step 1301).

The base station then transmits the appropriate number of user ID's to the wireless device that is to receive the information (step 1305). As discussed previously, the number of user ID's is based on type of information to be transmitted.

The base station generates Walsh codes, from those user ID's, to cover the data to be transmitted to the wireless device (step 1307). The covered data, in the form of a Walsh code symbol stream, is transmitted to the wireless device for decoding (step 1310).

To illustrate the gain in system capacity using the present invention, it is well known in the art that capacity (N), the number of simultaneous users, is given by:

$$N = 1 + \frac{G_S}{\frac{E_b}{N_o}} \cdot C$$

where C is an arbitrary constant that depends on voice activity factors, frequency reuse, sectorization, and soft hand-off $G_s$ is defined as:

$$G_S = 10\log\left(\frac{R_w}{R_b}\right)$$

where $R_W$ is the rate of the Walsh code and $R_b$ is the rate of the input signal For orthogonal CDMA with $R_W=R_b 2^n$, $G_s$ becomes:

$$G_s = 10\log 2^n.$$

The $E_b/N_o$ requirements are low for the radiotelephone system of the present invention due to the symbol error rate. Therefore, from the above equation for capacity, a system using the present invention experiences higher capacity.

As another illustration of the benefits of the present invention, FIGS. 6 and 7 compare a representation of the prior art to that of the present invention. The prior art system is a system that adheres to the CDMA specification IS-95.

The transmission bandwidth using the present invention has been reduced 50% from the 64 channels of the prior art to 32 channels. This is accomplished without any loss in RF capacity.

The preferred embodiment of the present invention is used in a satellite-based application. In this case, the base station is the satellite while the radiotelephone has the capability to communicate with the satellite over the appropriate frequency spectrum. Alternate embodiments of the present invention operate in a terrestrial cellular radiotelephone system, a home-based communication system, or a building-based communication system.

In summary, since the cross-correlation of Walsh codes is zero, the apparatus and processes of the present invention provide data transmission with a bit error rate $\leq 10^{-10}$ at $E_b/N_o=4.5$ dB. Moreover, the system capacity is also enhanced due to the low $E_b/N_o$.

Additionally, the present invention provides seamless orthogonal transmission and bandwidth on demand. Communications systems using the present invention do not require complex error control techniques normally required in a radio communications system.

We claim:

1. A multi-orthogonal code division parallel access apparatus for operation in a wireless communication system, the system communicating n-bit user identification codes to the apparatus, the apparatus comprising:
   a memory that stores a plurality of $2^n$-bit Walsh codes, the memory being addressed by the user identification codes such that each user identification code generates a Walsh code from the memory;
   a Walsh code register coupled to the memory and an input data stream, the register comprising a plurality of predetermined sequences of bits from the input data stream, each different predetermined sequence of bits generating a respective predetermined Walsh code to form a symbol stream that is orthogonal to all other symbol streams in the wireless communication system; and
   a modulator, coupled to the Walsh code register, for modulating the symbol stream for transmission over a wireless channel.

2. The apparatus of claim 1 wherein the memory has a size of $2^n \times 2^n$ where n is the length of the user identification code.

3. The apparatus of claim 1 wherein the Walsh code register comprises:
   a plurality of shift registers coupled to the memory, each shift register storing a Walsh code that is different from the Walsh codes stored in other shift registers of the plurality of shift registers;
   a multiplexer having selectable inputs, each selectable input coupled to one of the plurality of shift registers, the multiplexer further having an output that is coupled to a selected input of the selectable inputs; and
   an addressing register, coupled to the input data stream and the multiplexer, for selecting one of the selectable inputs for coupling to the multiplexer output.

4. A wireless communication system comprising:
   a plurality of devices coupled to a wireline network, each device having a unique protocol address, a first device communicating frames of data comprising the unique protocol address of the first device, the unique protocol address of a second device, and a payload of data;
   a routing device for routing information over the wireline network, the routing based on the unique protocol address of the second device; and a World Wide Web radio subsystem comprising:
      a wireless modem coupled to the wireline network, the wireless modem comprising an apparatus for encoding the payloads of data into orthogonal Walsh codes and transmitting the frames of data over a wireless channel; and
      a plurality of radio devices each comprising a receiver for receiving the transmitted frames of data, each radio device additionally having a multi-orthogonal code division parallel access apparatus for decoding the orthogonal Walsh code payloads in the received frames.

5. A multi-orthogonal code division parallel access apparatus for encoding and spreading a signal in a wireless communication system, the system comprising a wireless communication device communicating with a base station over a radio channel, the base station sending a plurality of n-bit user identification codes to the wireless communication device, the apparatus comprising:
   a memory that stores a plurality of $2^n$-bit Walsh codes, the memory being addressed by each of the plurality of user identification codes individually in an addressing operation, each addressing operation generating a unique Walsh code output for every unique user identification code, each unique Walsh code being orthogonal to all other Walsh codes in the wireless communication system; and
   a multiplexer having selectable inputs, each input coupled to a different one of the unique Walsh codes, the multiplexer selectively integrating the plurality of Walsh codes into an output serial data stream in response to an input binary data stream.

6. The apparatus of claim 5 wherein the input binary data stream is coupled to the multiplexer's selection inputs wherein the input binary data stream selects a selectable input based on a predetermined series of bits in the input binary data stream.

7. The apparatus of claim 6 wherein the multiplexer is clocked at a frequency equal to the input data rate divided by the quantity of the predetermined series of bits.

8. The apparatus of claim 6 and further including a modulator, coupled to the output serial data stream, for modulating the serial data stream for transmission over the wireless channel.

9. A method for communicating in a code division parallel access system, the system comprising a plurality of base stations communicating with a plurality of wireless devices, the base stations and wireless devices capable of communicating multiple types of information, the method comprising the steps of:

a first wireless device of the plurality of wireless devices requesting a predetermined number of user identification codes from a first base station in response to a type of information to be transmitted;

the first wireless device receiving the predetermined number of user identification codes from the first base station;

generating a plurality of Walsh codes in response to the predetermined number of user identification codes, each unique user identification code from the predetermined number of user identification codes generating a unique Walsh code from the plurality of Walsh codes; and substituting a first unique Walsh code for a predetermined sequence of input data to form a Walsh code stream.

10. The method of claim 9 and further including the step of modulating the Walsh code stream for transmission over a wireless channel.

11. A method for communicating in a code division parallel access system, the system comprising a plurality of base stations communicating with a plurality of wireless devices, the base stations and wireless devices capable of communicating multiple types of information, the method comprising the steps of:

a first base station sending a predetermined number of user identification codes to a first wireless device in response to a type of information to be transmitted to the first wireless device;

the first wireless device receiving the predetermined number of user identification codes from the first base station;

the first base station generating a plurality of Walsh codes in response to the predetermined number of user identification codes, each unique user identification code from the predetermined number of user identification codes generating a unique Walsh code from the plurality of Walsh codes;

substituting a first unique Walsh code for a predetermined sequence of input data to form a Walsh code stream;

transmitting the Walsh code stream to the first wireless device; and the first wireless device decoding the Walsh code stream using Walsh codes generated from the received predetermined number of user identification codes.

* * * * *